United States Patent [19]
De Marco

[11] 3,725,464
[45] Apr. 3, 1973

[54] PROCESS FOR METHOXYETHYL CARBAMATE

[75] Inventor: John Gregory De Marco, Bridgewater Township, Somerset County N.J.

[73] Assignee: American Cyanamid Company, Stamford, Conn.

[22] Filed: Dec. 23, 1971

[21] Appl. No.: 211,793

[52] U.S. Cl. ..............................................260/482 C
[51] Int. Cl. ................................................C07c 125/04
[58] Field of Search ..................................260/482 C

[56] References Cited

UNITED STATES PATENTS

| | | | |
|---|---|---|---|
| 2,837,561 | 6/1958 | Beinfest et al. | 260/482 C |
| 3,554,730 | 1/1971 | Scater et al. | 260/482 C |

*Primary Examiner*—Henry R. Jiles
*Assistant Examiner*—Paul J. Killos
*Attorney*—Charles Joseph Fickey

[57] ABSTRACT

Anhydrous aluminum chloride is used as a catalyst for the reaction of 2-methoxyethanol with urea to give 2-methoxyethyl carbamate.

5 Claims, No Drawings

PROCESS FOR METHOXYETHYL CARBAMATE

This invention relates to an improved process for 2-methoxyethyl carbamate, an intermediate for textile finishing agents. More particularly, this invention relates to the use of anhydrous aluminum chloride as a catalyst in the process for 2-methoxyethyl carbamate whereby urea is reacted with 2-methoxyethanol.

Methylolated 2-methoxyethyl carbamate compounds are valuable agents for use in wash-and-wear and permanent press finishes for cellulosic textile materials. The compounds can be obtained by reaction of 2-methoxyethyl carbamate with formaldehyde under alkaline conditions. (U.S. Pat. No. 3,369,858).

Alkyl carbamates, including hydroxy- and alkoxyalkyl carbamates, are manufactured by reacting urea, with the corresponding alcohol in accordance with the following equation:

$$ROH + H_2NCNH_2 \rightarrow ROCNH_2 + NH_3 \quad (1)$$

wherein R is alkyl, hydroxyalkyl, or alkoxyalkyl. (Org. Syn., Coll. Vol. I, p. 140; U.S. Pat. Nos. 2,837,561 and 2,871,259). Various proposals have been made to improve the yields of alkyl carbamates and the ease with which the reactions can be carried out. A large variety of metal salts or metal oxide catalysts have been suggested, particularly copper salts (U.S. Pat. No. 2,837,561), zinc salts and zinc oxide (U.S. Pat. No. 3,086,987); aluminum, zinc, manganese, tin, cobalt and nickel salts, oxides and alkoxides (U.S. Pat. No. 3,013,064 and 3,013,065).

An object of the invention is to provide a process for obtaining 2-methoxyethyl carbamate is increased yield and shorter reaction time.

It has now been discovered that when anhydrous aluminum chloride is used as the catalyst in the reaction of urea with 2-methoxyethanol, the yield and purity of 2-methoxyethyl carbamate is improved as compared with the use of previously disclosed catalysts. Also, the reaction can be carried to completion in a shorter length of time than previously possible.

The presence of water is detrimental to the process of this invention. Not only is the yield of product greatly reduced when hydrated aluminum chloride ($AlCl_3 \cdot 6H_2O$) is used instead of anhydrous aluminum chloride, but the reactants should be free of water. Any convenient method for drying the urea and 2-methoxyethanol can be used. In one procedure, the alcohol can be contacted with a desiccant, i.e., an agent capable of removing water by reaction with water or by absorption of water. The desiccant should be inert with respect to the alcohol. Suitable desiccants include anhydrous calcium sulfate, sodium sulfate, calcium chloride, and the like.

In another procedure, the alcohol or a mixture of alcohol and urea can be dried by distillation of a portion of the alcohol, which has a boiling point of about 125° C. The distillate consists of alcohol and any water which may be present.

While in theory, as shown in Equation (1), equimolecular amounts of urea and 2-methoxyethanol can be employed, in practice it is advantageous for maximum yield and purity of product to employ an excess over theory of 2-methoxyethanol. Thus at least 1.1 moles, preferably between 1.8 and 3 moles, of 2-methoxyethanol may be employed per mole of urea.

The amount of anhydrous aluminum chloride employed is between 0.01 and 0.1 moles, preferably between 0.02 and 0.05 moles, per mole of urea.

The reaction temperature used is between 110° C. and the reflux temperature of the reaction mixture, preferably between 125° and 150°C.

The completion of the reaction is determined by analysis of aliquots of the reaction mixture. Vapor phase chromatography is a particularly convenient method of analysis. When the reaction temperature is within the preferred range of temperatures, about 4-5 hours are required.

The yield of 2-methoxyethyl carbamate by the process of this invention is at least 95 percent, and normally at least 97 percent, of theory. The product is sufficiently pure that for many purposes purification is not required.

For example, when the 2-methoxyethyl carbamate is to be methylolated to produce textile finishes, it is sufficient to remove a portion of the unreacted 2-methoxyethanol by distillation, preferably in vacuo, and to employ the remaining mixture of 2-methoxyethyl carbamate and 2-methoxyethanol in the reaction with formaldehyde. The reaction of 2-methoxyethyl carbamate with formaldehyde can be carried out in accordance with well-known procedures for methylolating alkyl carbamates. (American Dyestuff Reporter 50, P–849, 51, P–800; 54, P–485; U.S. Pat. No. 3,369,858). The methylolated 2-methoxyethyl carbamate textile finishes can be applied to cellulosic textile materials using standard procedures for such finishes in order to impart wash-and-wear and permanent press properties to the textile materials.

The following Specific Examples are given to illustrate certain embodiments of the invention to persons skilled in the art and are not intended to be limitative.

EXAMPLE 1

A mixture of 760 g (10 moles) of technical 2-methoxyethanol which had been dried over anhydrous calcium sulfate, 300 g. (5 moles) of urea and 15 g of anhydrous aluminum chloride was heated at the reflux temperature (130°–147° C.) for 5 hours. Analysis of the reaction mixture by vapor phase chromatography indicated a yield of 2-methoxyethyl carbamate of 98.5 percent of theory. The product mixture was distilled to recover 370 g of 2-methoxyethanol. The residual product was suitable without further purification for use in preparing methylol 2-methoxyethyl carbamate.

When the above procedure was repeated using technical 2-methoxyethanol which had not been dried over anhydrous calcium sulfate, the yield of 2-methoxyethyl carbamate was 82.5 percent of theory. (R–7354–132)

Also, when undried technical 2-methoxyethanol and hydrated aluminum chloride ($AlCl_3 \cdot 6H_2O$) were used, the yield of 2-methoxyethyl carbamate was 23 percent of theory. (R–7364–141)

EXAMPLE 2

A mixture of 860 g of technical 2-methoxyethanol and 300 g of urea was distilled at a pot temperature of 133°–134° C. until 110 g of distillate had been collected. Anhydrous aluminum chloride (15 g) was added at 120° C. and the mixture was heated at the reflux temperature (132°–150° C.) for 4 hours. Analysis of the reaction mixture indicated a yield of 98.5 percent of theory of 2-methoxyethyl carbamate. The product mixture was distilled at 100 mm of pressure, recovering 300 g of 2-methoxyethanol. The remaining product could be used without further purification in the preparation of methylol 2-methoxyethyl carbamate.

I claim:

1. In the process for producing 2-methoxyethyl carbamate whereby urea is reacted with 2-methoxyethanol at an elevated temperature, the improvement which comprises carrying out the reaction in the presence of a catalytic amount of anhydrous aluminum chloride.

2. The process of claim 1 wherein the temperature is from about 110° C. and up to the reflux temperature of the reaction mixture.

3. The process of claim 1 wherein the amount of anhydrous aluminum chloride is from about 0.01 to 0.1 moles per mole of urea.

4. The process of claim 1 wherein an excess of 2-methoxyethanol is used.

5. The process of claim 4 wherein the amount of 2-methoxyethanol is from about 1.1 to 3 moles per mole of urea.

* * * * *